Oct. 21, 1941.  L. J. WINCHELL  2,259,676
LAWN MOWER
Filed May 31, 1940  2 Sheets-Sheet 2
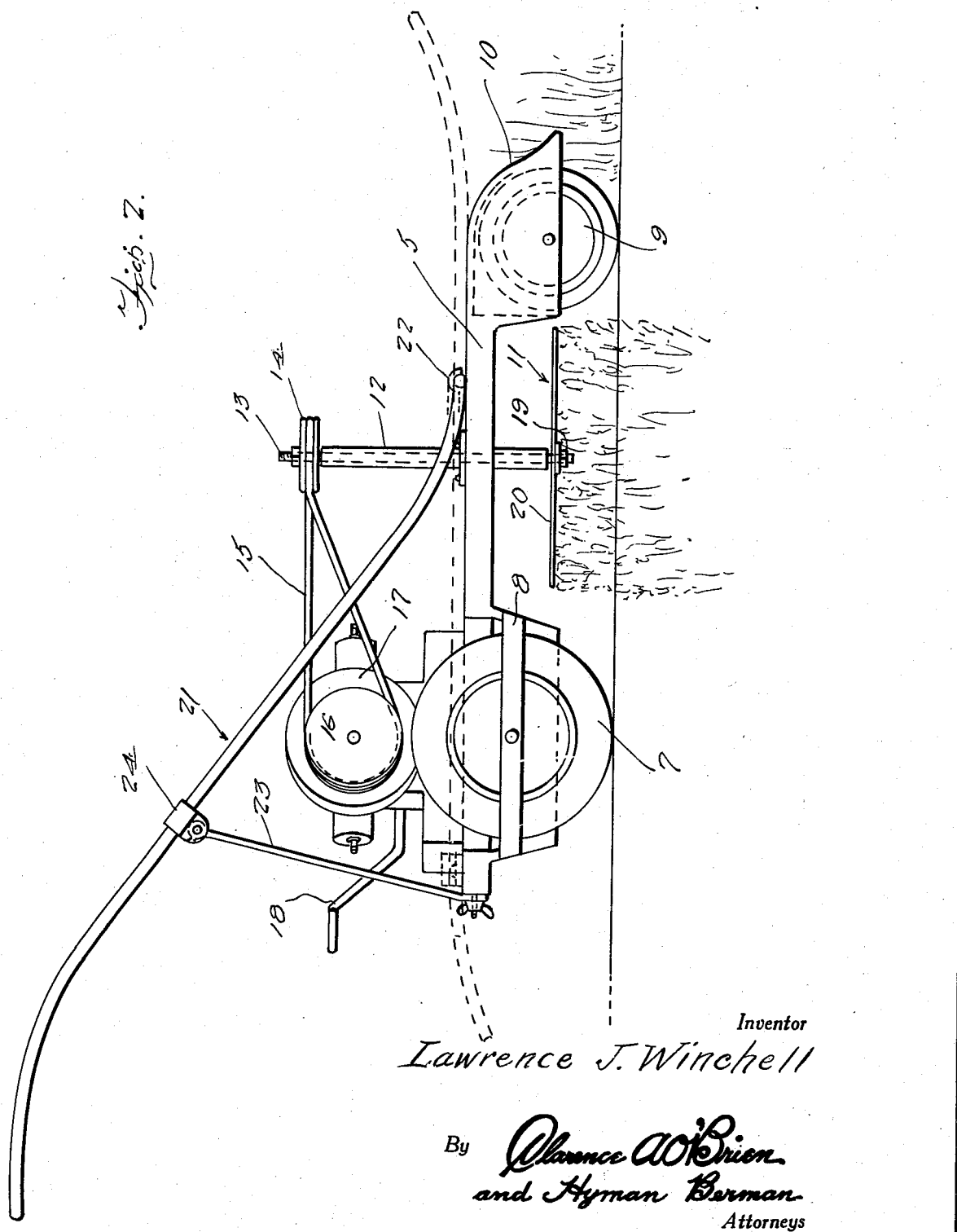
Inventor
Lawrence J. Winchell
By Clarence A. O'Brien
and Hyman Berman
Attorneys Patented Oct. 21, 1941

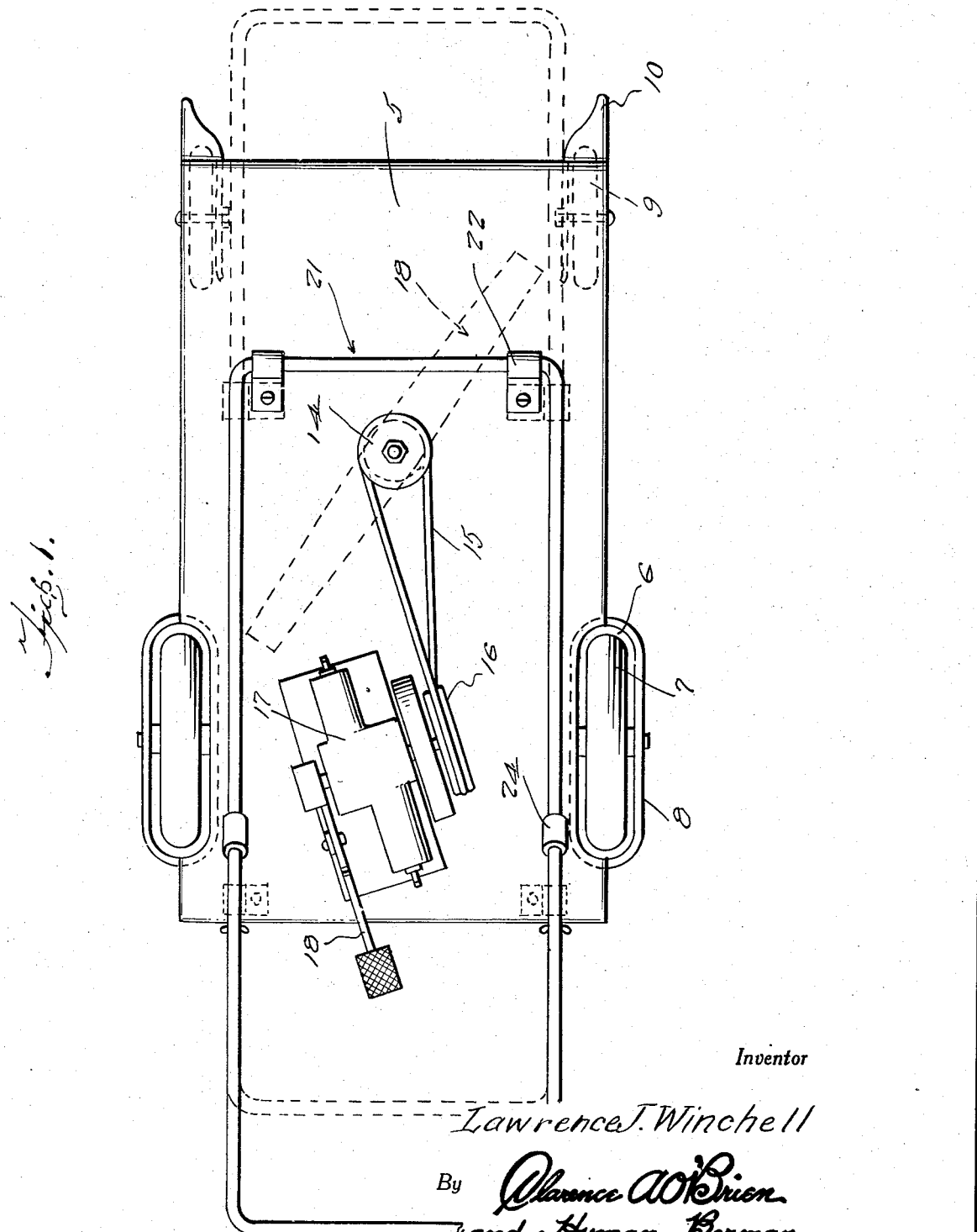

2,259,676

UNITED STATES PATENT OFFICE 2,259,676

LAWN MOWER

Lawrence J. Winchell, Fort Scott, Kans.

Application May 31, 1940, Serial No. 338,277

1 Claim. (Cl. 56—25.4)

This invention relates to lawn mowers, and has for the primary object the provision of an efficient and inexpensive device of this character which will be extremely simple and easy to operate and which may be employed for cutting hedges and the like as well as grass, by a simple adjustment of the handles thereof, whereby persons at the ends of the device may easily support the latter over a hedge for trimming said hedge and with very little effort on the part of said persons.

With these and other objects in view the invention consists in certain novel features of construction, combination and arrangement of parts to be hereinafter more fully described and claimed.

For a complete understanding of my invention, reference is to be had to the following description and accompanying drawings, in which Figure 1 is a top plan view illustrating a lawn mower constructed in accordance with my invention.

Figure 2 is a side elevation illustrating the device.

Referring in detail to the drawings, the numeral 5 indicates a platform of substantially rectangular shape and is provided at opposite sides thereof and adjacent one end with wheel receiving slots 6 to receive rear wheels 7 journaled on the platform and preferably of the type having cushion tires. Curved guard strips 8 are secured on the platform and surround the wheels and act as supports for the axles of said wheels.

The platform 5 at opposite sides thereof and adjacent the other end is provided with front wheels 9 also of the cushion type and integral with the platform and partly overlying said front wheels are guards 10 which will tend to prevent grass and other foliage from winding into said front wheels during the use of the device and also act to direct the grass between the front wheels and to a rotatable cutter 11.

A vertically arranged supporting sleeve 12 is carried by the platform rearwardly of the front wheels and extends above and below said platform and has journaled therein a shaft 13 to which is adjustably and detachably connected a pulley 14 engageable with the upper end of the supporting sleeve for the purpose of limiting the downward movement of the shaft 13 and which will permit the shaft to be adjusted upwardly and downwardly by adjusting said pulley on the shaft. An endless belt 15 is trained over the pulley 14 and over a pulley 16 secured on an internal combustion engine 17 mounted on the platform 5 between the wheels 7. It is preferable that the engine 17 be of extremely light weight and the cranking lever thereof is indicated by the character 18, the free end of which is positioned rearwardly of the platform and is in the form of a pedal so that the operator by engaging the pedal with a foot may readily bring about starting of the engine 17.

Secured to the lower end of the shaft 13 by a nut 19 is the cutter 11 preferably in the form of an elongated blade 20 having suitable cutting edges. The blade rotates about a vertical axis, the shaft and sleeve 12 providing said axis, so that during the rotation grass and other similar growth will be cut to a selected height from the ground, as shown in Figure 2. Through the adjustment of the pulley 14 on the shaft the distance between the blade 20 and the ground may be varied.

A handle construction 21 is provided for the device which will permit a person to conveniently push the device in a desired direction over the ground and is easily adjustable so as to be arranged to permit persons at the ends of the platform to support the device over a hedge for the purpose of trimming the latter. The handle construction consists of a substantially rectangular frame which has the sides thereof provided with compound curves so that when one of the ends of the frame is secured on the platform by clips 22 the other end will be disposed rearwardly of the platform to permit gripping thereof by the operator. It will be seen that the handle construction extends upwardly and rearwardly from the platform and is supported in this position by means of braces 23. The braces are pivotally connected on clips or collars 24 carried by the frame construction and are detachably and adjustably connected onto the rear end of the platform. The handle construction may be readily brought into the dotted line position, as shown in Figure 2, so that the ends thereof are positioned forwardly and rearwardly of the platform for permitting the persons at the ends of the platform to support the device therebetween. The clips assume the dotted line position, as shown in Figure 1, when the handle construction is arranged in the dotted line position of Figure 2 and the braces 23 are adjusted to further secure the handle construction in the dotted line position.

From the foregoing description taken in connection with the accompanying drawings, it will be seen that due to the arrangement of the frame and wheels, that the wheels travel within the swath cut in the grass, consequently permitting cutting the grass close to objects and thereby eliminating hand trimming of grass and further obviate the wheels mashing down tall grass and thereby creating a ragged looking lawn.

It is believed that the foregoing description, when taken in connection with the drawings, will fully set forth the construction and advantages of this invention to those skilled in the art to which such device relates, so that further detailed description will not be required.

Having described the invention, what I claim is

In a lawn mower, a substantially rectangular shaped platform having slotted portions at opposite edges and adjacent one end thereof, rear wheels journaled on the platform and located in the slotted portions to permit walls of said portions to form guards for said wheels, a rotary cutter journaled on the platform forwardly of said wheels, power means connected to said cutter and supported by said platform, a handle connected to the platform, depending walls formed on the platform at opposite corners thereof and extending downwardly and forwardly of one edge of said platform to connect the walls in pairs and to provide guards for directing grass to the cutter, and front wheels located partly within the pairs of depending walls and journaled thereon.

LAWRENCE J. WINCHELL.